United States Patent
Kasahara et al.

(10) Patent No.: US 7,726,375 B2
(45) Date of Patent: Jun. 1, 2010

(54) LAMINATOR

(75) Inventors: Masato Kasahara, Okazaki (JP); Shin Nakamura, Akashi (JP)

(73) Assignee: Nisshinbo Industries, Inc., Tokyo (JP)

( * ) Notice: Subject to any disclaimer, the term of this patent is extended or adjusted under 35 U.S.C. 154(b) by 30 days.

(21) Appl. No.: 12/155,493

(22) Filed: Jun. 5, 2008

(65) Prior Publication Data

US 2009/0000747 A1 Jan. 1, 2009

(30) Foreign Application Priority Data

Jun. 13, 2007 (JP) .............................. 2007-155801

(51) Int. Cl.
    *B32B 37/00* (2006.01)
(52) U.S. Cl. ....................... 156/579; 156/580
(58) Field of Classification Search ................. 156/228, 156/580, 581, 583.1, 583.3; 100/315, 211
    See application file for complete search history.

(56) References Cited

U.S. PATENT DOCUMENTS

| | | | |
|---|---|---|---|
| 2,575,734 A | 11/1951 | Schulman | |
| 4,699,276 A | 10/1987 | Kis | |
| 5,725,711 A * | 3/1998 | Taylor | ......................... 156/228 |
| 2006/0205331 A1* | 9/2006 | Gringer et al. | .............. 451/532 |
| 2007/0000826 A1 | 1/2007 | Stevens | |

FOREIGN PATENT DOCUMENTS

| | | |
|---|---|---|
| DE | 101-63-294 A1 | 7/2003 |
| EP | 0-129-677 A | 1/1985 |
| EP | 0-236-812 A | 9/1987 |
| EP | 1-525-946 A | 4/2005 |
| JP | 55-096246 A | 7/1980 |
| JP | 62-176723 A | 8/1987 |
| JP | 3037201-U S | 2/1997 |
| JP | H09-141743 A1 | 6/1997 |
| JP | H11-204811 A1 | 7/1999 |
| JP | 2002-347115 A | 12/2002 |
| JP | 3890206 B2 | 12/2002 |

* cited by examiner

*Primary Examiner*—James Sells
(74) *Attorney, Agent, or Firm*—Orion Consulting, Ltd.; Joseph P. Farrar

(57) ABSTRACT

A laminator 100 in which the diaphragm can be mounted simply and easily without the use of a mounting frame. The laminator 100 includes an upper chamber 110, on the bottom surface of which is mounted the diaphragm 140, and a lower chamber 120 on which the upper chamber 110 is stacked and in which is disposed a support base 130 on which a workpiece A that is to be laminated is set. The diaphragm 140 is larger than the upper chamber 110, and an excess portion of the diaphragm that protrudes outside the upper chamber when the diaphragm is mounted on the upper chamber is folded upward and clamped against the sides of the upper chamber by multiple clamps to fix the diaphragm in place on the upper chamber.

3 Claims, 6 Drawing Sheets

LAMINATOR

CLAIM FOR PRIORITY

The present specification claims priority pursuant to 35 U.S.C. §119 from Japanese Patent Application No. 2007-155801, filed on Jun. 13, 2007 in the Japan Patent Office, the entire contents of which are hereby incorporated by reference herein.

BACKGROUND

1. Field of the Invention

The present invention relates to a laminator for manufacturing laminated objects such as photovoltaic cell modules, and more particularly, to a diaphragm mounting structure used in such a laminator.

2. Description of the Background Art

Examples of conventional laminators used to manufacture photovoltaic cell modules are described, for example, in Japanese Unexamined Patent Application Publication No. 9-141743 (JP-H09-141743-A), Japanese Unexamined Patent Application Publication No. 11-204811 (JP-H11-204811-A), and Japanese Registered Utility Model No. 3037201 (JP-3037201-U). For these types of laminators, an arrangement is employed in which upper and lower chambers are used. The upper chamber is movable vertically, or openably closable, with respect to the lower chamber, and has at its lower end a downwardly expandable diaphragm. The lower chamber has a support pedestal including a heating plate inside. When the upper chamber descends, or closes, it acts as a lid on the lower chamber.

The laminator is used in the following way: First, with the upper chamber raised and opened, a workpiece placed on a conveyer belt is conveyed to and placed on the heating plate provided in the lower chamber. A photovoltaic cell module workpiece has a bottommost layer that is a glass plate, on top of which are layered, in order, a sheet-like filler, the photovoltaic cell, and then another sheet-like filler, with an uppermost layer consisting of a sheet-like backing. The upper chamber is then stacked on top of the lower chamber and the air in both the upper chamber and the lower chamber is removed to form a vacuum, in which the workpiece is heated. Subsequently, air is introduced into only the upper chamber, causing the diaphragm to expand and sandwiching the photovoltaic cell module workpiece between the top face of the heating board and the diaphragm. The heat from the heating board melts the filler, causing a cross-linking reaction and curing to form the laminated object.

The usual method of fixing the diaphragm onto the upper chamber is to prepare a rectangular mounting frame shaped to fit the outer form of the upper chamber and sandwich and fix in place an outer peripheral portion of the diaphragm between the mounting frame and the upper chamber. Multiple bolt holes are opened in the periphery of the diaphragm, and multiple threaded screw holes are provided at corresponding positions in the mounting frame. Further, through-holes are provided at positions corresponding to the bolt holes and the threaded screw holes, such that, when the diaphragm is sandwiched between the upper chamber and the mounting frame, bolts are inserted in the through-holes, screwed into the threaded screw holes in the mounting frame, and tightened, fixing the diaphragm in place.

However, with such a mounting arrangement, when the diaphragm expands tensile stress is exerted on the portions of the periphery of the diaphragm that are compressed by the mounting frame. This tensile stress extends to the diaphragm bolt hole portions as well, the bolt holes tear, gradually grow large, and are damaged, and eventually become unable to maintain a vacuum. Moreover, if the diaphragm is damaged, it must, of course, be replaced. Removing a damaged diaphragm involves removing all the multiple bolts. These bolts must then be reinserted and re-tightened in order to mount the new diaphragm. Thus, replacing the diaphragm generates costs and adds to down-time of the laminator.

One approach to solving the above-described problem is a laminator like that shown in FIG. 6 and a diaphragm mounting structure, proposed by the applicant in Japanese Patent No. 3890206 (JP-3890206-B).

A laminator 10 shown in FIG. 6 includes a rectangular upper chamber 11 and a lower chamber 12 having a top face of the same shape as a bottom face of the upper chamber 11. The upper chamber 11 has a suction port 11a connected to a vacuum pump for depressurization, with a similar suction port 12a formed in the lower chamber 12. A support pedestal 13 on which is set a workpiece A consisting of a photovoltaic cell module is disposed inside the lower chamber 12. A diaphragm 14 is of the same shape as or slightly larger than the upper chamber 11, with a peripheral portion thereof sandwiched between the upper chamber 11 and a mounting frame 15.

The mounting frame 15 is a metal rectangular frame of the same shape and size as the upper chamber 11, on the outside of which are provided multiple hooks 15a. Clamps 16 are mounted on the upper chamber 11 at positions corresponding to the positions of the hooks 15a. Each of the clamps 16 includes a clamp lever 16a and a clamp ring 16b. The clamp lever 16a is rotatable about a shaft 16c. When the hook 15 is inserted into the clamp ring 16b and the clamp lever 16a is rotated from a substantially horizontal position to the vertical position shown in FIG. 6, the diaphragm can be compressed and sandwiched between the mounting frame 14 and the upper chamber 11.

A groove is formed in the bottom face of the upper chamber 11 that contacts the mounting frame 15. A first O-ring 17 is inserted into the groove to make contact between the upper chamber 11 and the diaphragm 14 airtight.

Similarly, a groove is formed in the bottom face of the mounting frame 15 and a second O-ring 18 inserted into the groove, such that, when the upper chamber 11 is set on top of the lower chamber 12, the space between the upper and lower chambers 11 and 12 is airtight.

With such a structure, there is no need to open bolt holes in the diaphragm 14, and thus the life of the diaphragm can be extended. In addition, using clamps instead of bolts in the mounting frame 15 simplifies the work of removing and replacing the diaphragm 14, enabling replacement time to be shortened.

However, in the arrangement disclosed in Japanese Patent No. 3890206 (JP-3890206-B), as noted, the mounting frame is metal and substantially the same size as the bottom face of the upper chamber 11. At the same time, the size of photovoltaic cells (and therefore of photovoltaic cell modules also) increases year by year. As a result, mounting frames are also getting larger and therefore also heavier, which means that they can be awkward to handle.

BRIEF SUMMARY OF THE INVENTION

The present invention provides a laminator of which the diaphragm can be mounted and removed easily without the use of a mounting frame.

The present invention provides a laminator comprising an upper chamber, a diaphragm mounted on a bottom surface of the upper chamber, and a lower chamber, on which the upper chamber is stacked and which includes a support base on which a workpiece A to be laminated is set. The diaphragm is larger than the upper chamber, such that an excess portion of the diaphragm protruding outside the upper chamber in a state in which the diaphragm is mounted on the upper chamber is folded upward and clamped against sides of the upper chamber by a plurality of clamps to fix the diaphragm in place on the upper chamber.

Each of the clamps may have an operating lever that, when operated, enables one-touch switching between a clamped state and an unclamped state of the diaphragm against the sides of the upper chamber.

In addition, the upper chamber may have a rectangular shape and the plurality of clamps is provided only along opposed long sides of the rectangular-shaped upper chamber.

Moreover, a flat panel may be inserted between the clamps and the diaphragm when the excess portion of the diaphragm that protrudes outside the upper chamber when the diaphragm is mounted on the upper chamber is folded upward and clamped against the sides of the upper chamber by the plurality of clamps.

In the laminator having the construction described above, the diaphragm is fixed in place on the lateral side surfaces of the upper chamber, rendering use of a mounting frame unnecessary. The unique effect of such an arrangement is that the diaphragm can be mounted quickly and easily.

Other features and advantages of the present invention will be apparent from the following description when taken in conjunction with the accompanying drawings, in which like reference characters designate similar or identical parts throughout the several views thereof.

DETAILED DESCRIPTION

A detailed description will now be given of illustrative embodiments of the present invention, with reference to the accompanying drawings.

Figure 1:
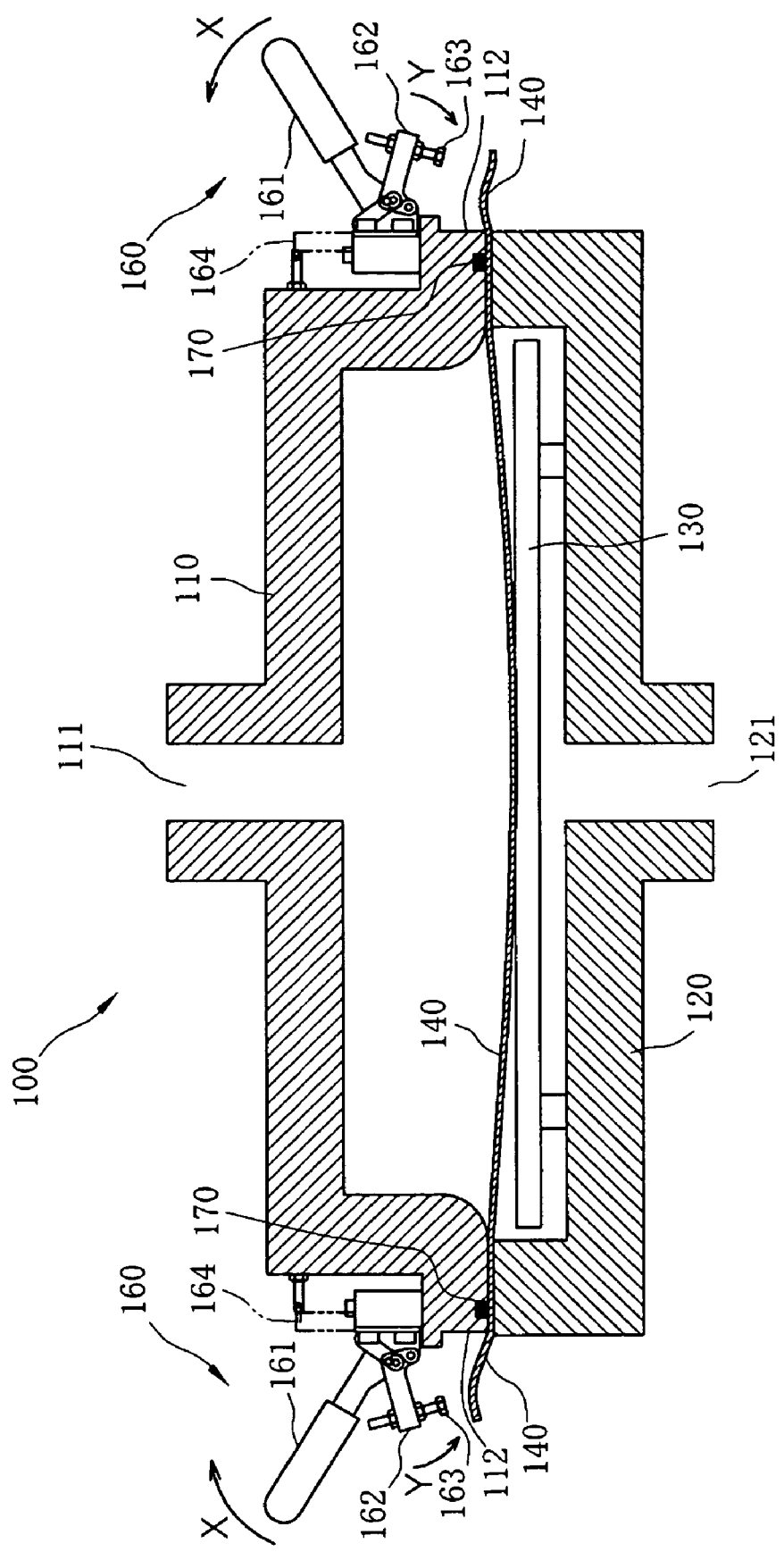
FIG. 1 is a sectional view of essential portions of a laminator according to the present invention.
Figure 2:
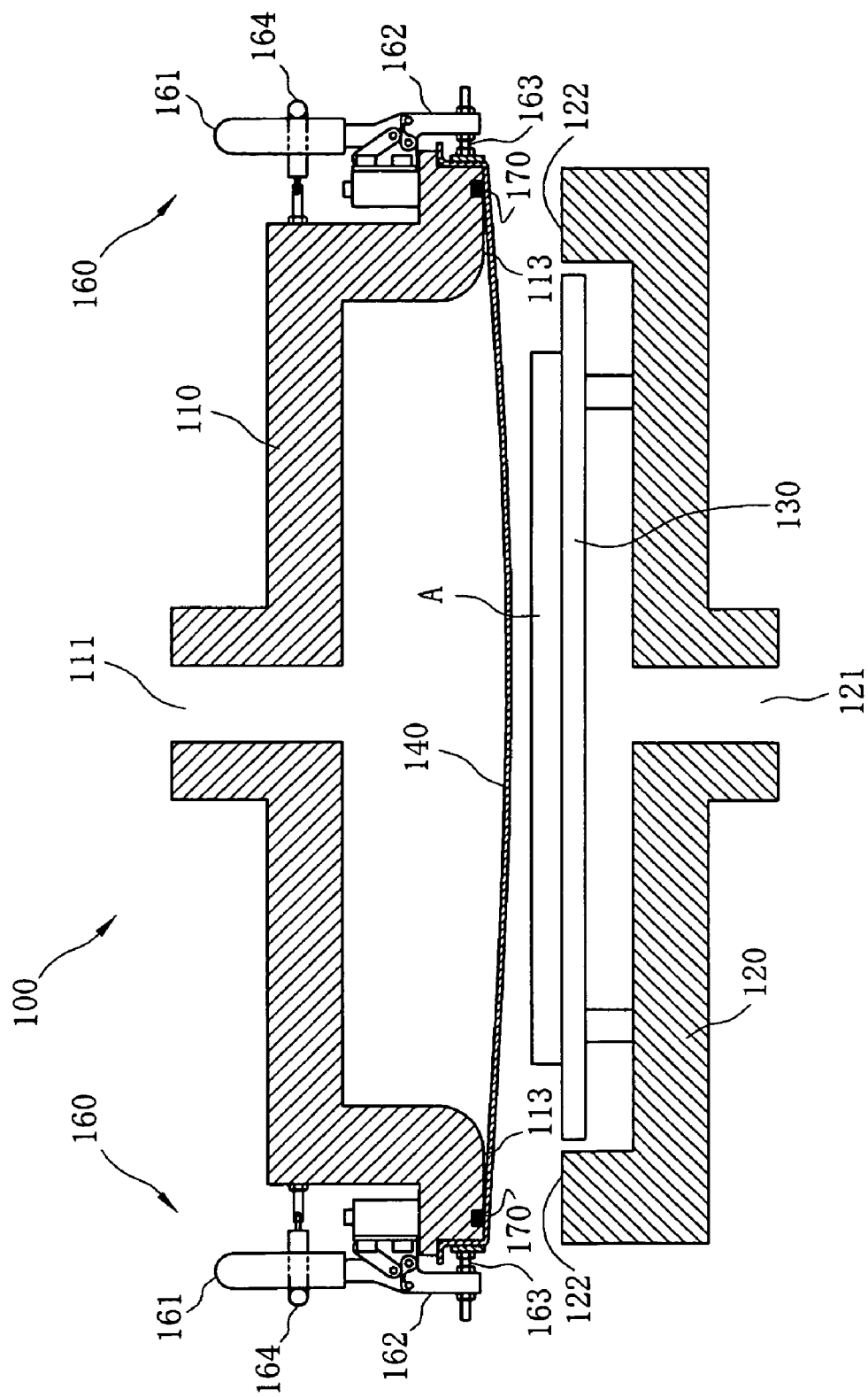
FIG. 2 is a sectional view of the laminator of FIG. 1, with a diaphragm clamped in place.
Figure 3:
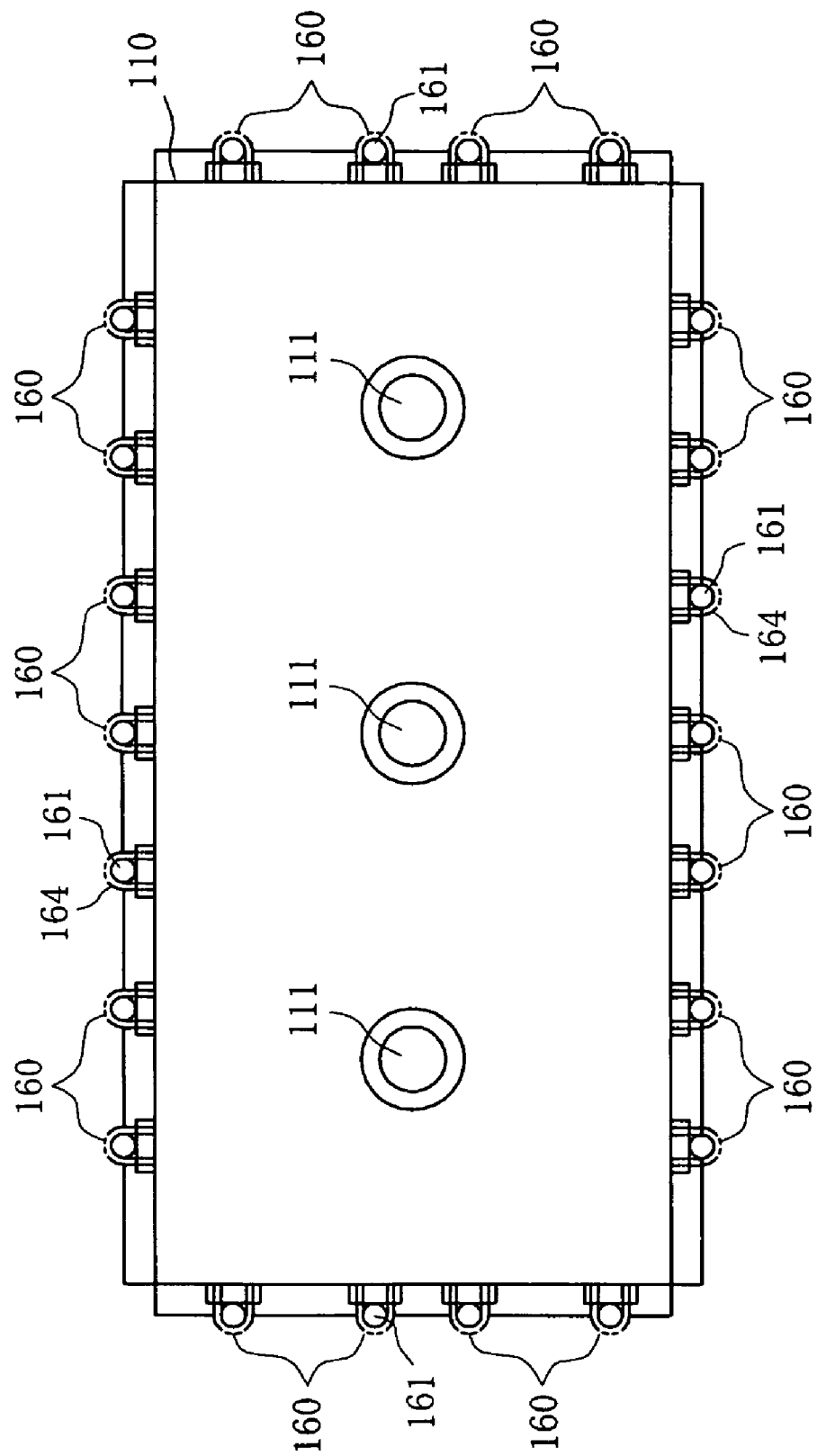
FIG. 3 is a plan view of the upper chamber with the diaphragm mounted thereon.

FIG. 1 is a sectional view of essential portions of a laminator according to the present invention. FIG. 2 is a sectional view of the laminator of FIG. 1, with a diaphragm clamped in place. FIG. 3 is a plan view of the upper chamber with the diaphragm mounted thereon.

The laminator 100 includes an upper chamber 110 and a lower chamber 120. A bottom face 113 of the upper chamber 110 and a top face 122 of the lower chamber 120 are rectangles of the same size. Three suction ports 111 coupled to a vacuum pump, not shown, are provided at a top of the upper chamber 110. Similarly, three other suction ports 121, not shown in the plan view, are provided at a bottom of the lower chamber 120. A support pedestal 30 is provided in an interior space of the upper chamber 120.

The diaphragm is mounted as follows: First, the upper chamber 110 is lifted upward and a diaphragm 140 is spread over the top of the lower chamber 120. The diaphragm 140 is larger than the lower chamber 120 both lengthwise and widthwise, and therefore a periphery thereof protrudes outside the lower chamber 120. Once the diaphragm 140 is spread out, the upper chamber 110 is lowered onto the lower chamber 120. The diaphragm 140 protrudes outside the portions where the upper chamber 110 and the lower chamber 120 meet. At this time, clamps 160 of the upper chamber 110 are in an open state.

Each clamp 160 includes an operating lever 161 and a smaller pressure lever 162, with a pressure bolt 163 provided on the pressure lever 162. Adjusting a length of the pressure bolt 163 adjusts the pressing force. Reference numeral 164 designates an annular spring 164 that is described in greater detail later.

In the state shown in FIG. 1, that portion of the diaphragm 140 which protrudes from the lower chamber 120 is folded upward against lateral side surfaces 112 of the upper chamber 110.

Next, the operating levers 116 of the clamps 160 are rotated in a direction indicated by arrows X in FIG. 1, causing the pressure levers 162 to rotate with them in an opposite direction as indicated by separate arrows Y. When the operating levers 116 reach the vertical position shown in FIG. 2, tips of the pressure bolts 163 press the diaphragm 140 against the lateral side surfaces 112 of the upper chamber 110, fixing the diaphragm in place. Once the operating levers 161 are vertical, the annular springs 164 are stretched around them to keep the operating levers 116 vertical and thus prevent the operating levers 116 from inadvertently rotating, or being rotated, to an unlocked position.

As shown in FIG. 3, the clamps 160 are disposed along opposed long sides and short sides of the upper chamber 110. When all these clamps 160 are put into the state shown in FIG. 2, the diaphragm 140 is fixed in place on the upper chamber 110.

In the laminator of the present invention, a mounting frame is not needed to mount the diaphragm on the upper chamber 110. In addition, by rotating the operating levers 116 the clamps 160 can be switched between a clamped state and an unclamped state at a touch, which is very simple and easy. The foregoing configuration enables the diaphragm 140 to be mounted on and removed from the upper chamber 110 with ease.

Although the diaphragm 140 is fixed in place along the lateral side surfaces 112 of the upper chamber 110, the diaphragm 140 is not in any way held against the bottom face of the upper chamber 110. Therefore, the diaphragm 140 in its natural state sags at the center as shown in FIG. 2. Consequently, an O-ring 170 is provided in a groove in the bottom face of the upper chamber 110. The O-ring 170 maintains an airtight contact between the upper chamber 110 and the diaphragm 140.

In the embodiment described above, the clamps are provided along both the short and long sides of the upper chamber 110. Alternatively, however, where the diaphragm is small or light, the clamps along the short sides may be omitted. This is because, when the upper chamber 110 is set on the lower chamber 120 and the pressure inside the upper chamber 110 is reduced by the vacuum pump via the suction ports 111, if the diaphragm 140 is small or light it is sucked against the bottom face 113 of the upper chamber 110 at the short sides anyway, eliminating any gap. Even with a slight leak a predetermined reduced pressure can be easily maintained by operating the vacuum pump continuously.

It should be noted that, depending on the capabilities of the particular vacuum pump, ordinarily the pump does not stop even when a desired state of reduced pressure is reached but continues to operate anyway. Once the desired pressure is achieved, between having a leak and having no leak a load on the vacuum pump does increase somewhat in the case of the former, but the increase is not great enough to pose a problem.

A description is now given of the manner in which the laminator of the present invention laminates a photovoltaic cell module.

Figure 4:
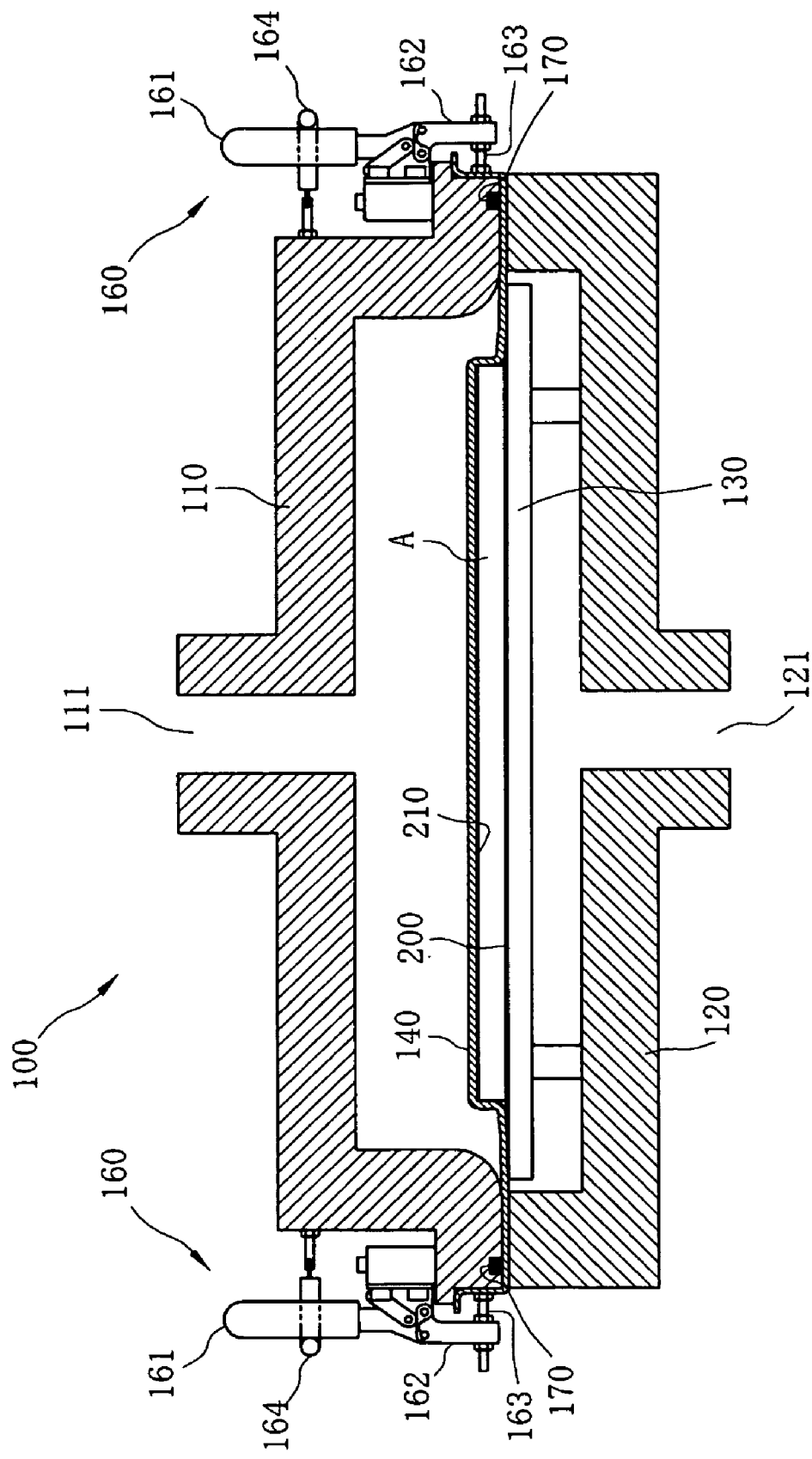
FIG. 4 is a diagram showing the upper chamber and a lower chamber stacked together, with a workpiece on a support pedestal being heated.

FIG. 4 is a diagram showing the upper chamber 110 and the lower chamber 120 stacked together, with a workpiece A on a support pedestal 130 being heated.

A photovoltaic cell module workpiece A is composed of strings connecting a plurality of photovoltaic cells immersed in a filler and sandwiched between a transparent cover glass on the bottom and a backing on the top (in other words, the photovoltaic cell module workpiece A is placed upside down). A transparent material such as polyethylene resin, for example, may be used as the backing. An opaque or semi-transparent EVA (ethylene vinyl acetate) resin, for example, may be used for the filler.

With the upper chamber 110 poised above the lower chamber 120 in a standby position, the workpiece A is conveyed by a conveyor belt 200 to a position atop the support pedestal 130. It should be noted that a protective peel-off sheet 210 is interposed between the diaphragm 140 and the workpiece A to prevent the filler inside the workpiece A from sticking to the diaphragm 140 when the filler melts.

Once the workpiece A is set on the support pedestal 130, the upper chamber 110 is lowered onto the lower chamber 120 and tightly contacted thereagainst. The O-ring 170 keeps the contact between the lower chamber 120 and the conveyor belt 200 airtight. Air is then sucked out of the upper and lower spaces partitioned by the diaphragm 140 through the suction ports 111 and 121 and the pressure reduced. When the pressure in the upper and lower spaces decreases to a predetermined pressure, a heating board built into the support pedestal 130 heats the workpiece A. At the same time, air is reintroduced into the interior of the upper chamber 110, causing the diaphragm 140 to expand in conformity with the shape of the workpiece A as shown in FIG. 4 and press down on the workpiece A. In this state the workpiece A is heated, the filler melts, a cross-linking reaction occurs, the EVA filler becomes fully transparent, and a photovoltaic cell module is produced.

When the diaphragm 140 expands as shown in FIG. 4, the peripheral portion of the diaphragm 140 is pulled inward and the O-ring 170 also deforms. In the conventional arrangement, in which the mounting frame retains the diaphragm, the deformation of the O-ring when the diaphragm expands gradually accumulates as lamination is repeated, and the O-ring deforms dramatically and eventually breaks.

However, in the present invention, once lamination is completed, the upper chamber 110 is returned to a standby position above the lower chamber 120 as shown in FIG. 2 and the center of the diaphragm 140 sags downward somewhat in its natural state. Since the diaphragm 140 returns to its natural state, the deformation of the O-ring 170 during lamination disappears and the O-ring 170 returns to its initial state. Therefore, in the present invention, even with repeated lamination the deformation of the O-ring 170 does not accumulate but is experienced only once. As a result, the life of the O-ring 170 is extended. In addition, although that portion of the diaphragm 140 which is sandwiched between the upper chamber 110 and the lower chamber 120 experiences deformation during lamination, this deformation also disappears when the state shown in FIG. 2 is reached, and thus deformation does not accumulate. Further, in the present invention, the diaphragm 140 is folded upward and held at the lateral side surfaces of the upper chamber 110 with great retentive force. Conventionally, the diaphragm is held by press-contact in a flat plane by a tensile force exerted when the diaphragm expands, with the result that sometimes the edges of the diaphragm 140 are pulled into the interior of the chamber, thus breaking the vacuum. In the present invention such a phenomenon no longer occurs.

Figure 5:
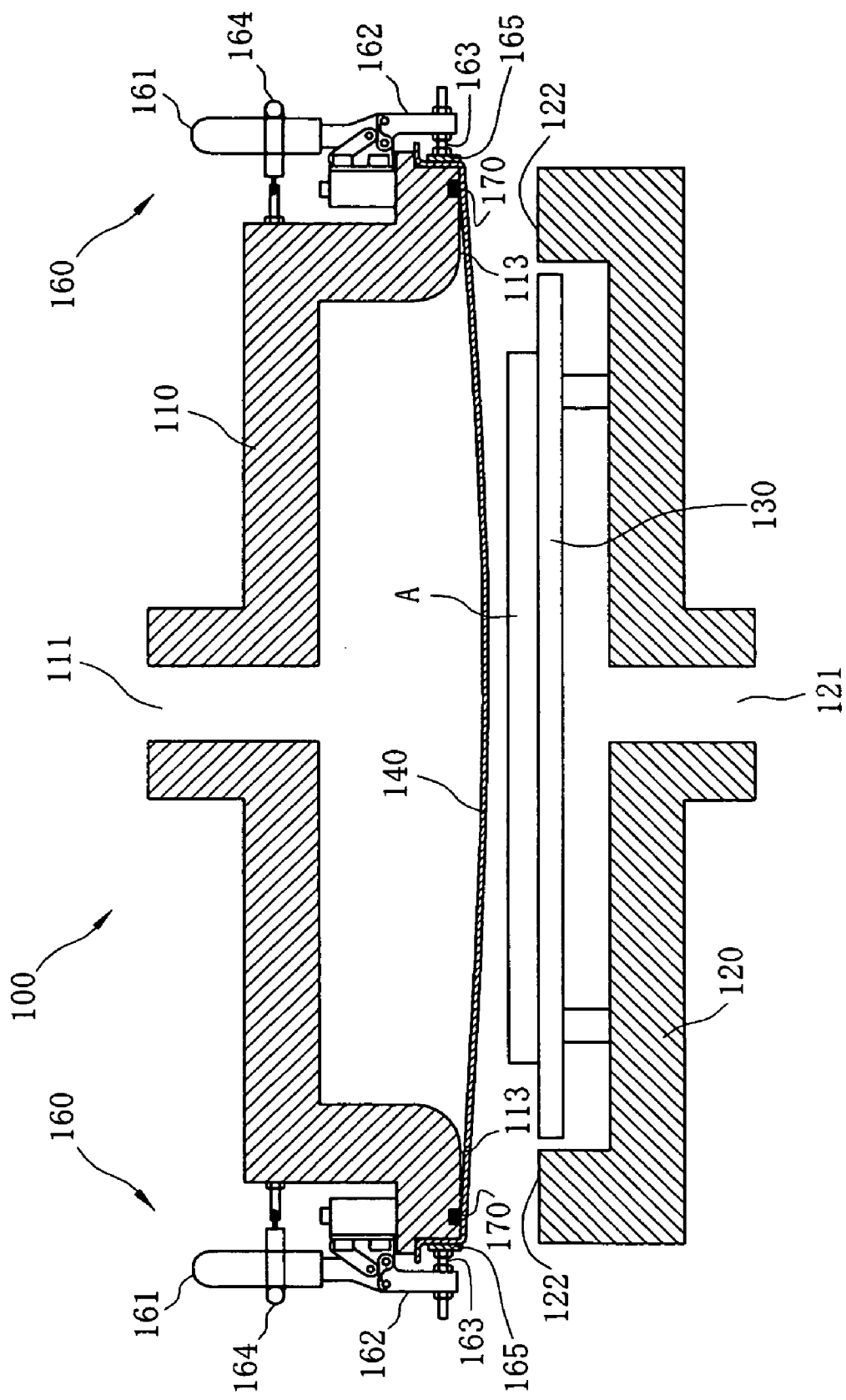
FIG. 5 is a diagram showing a second embodiment of the present invention, in which a flat panel is provided at tips of pressure bolts of clamps.
Figure 6:
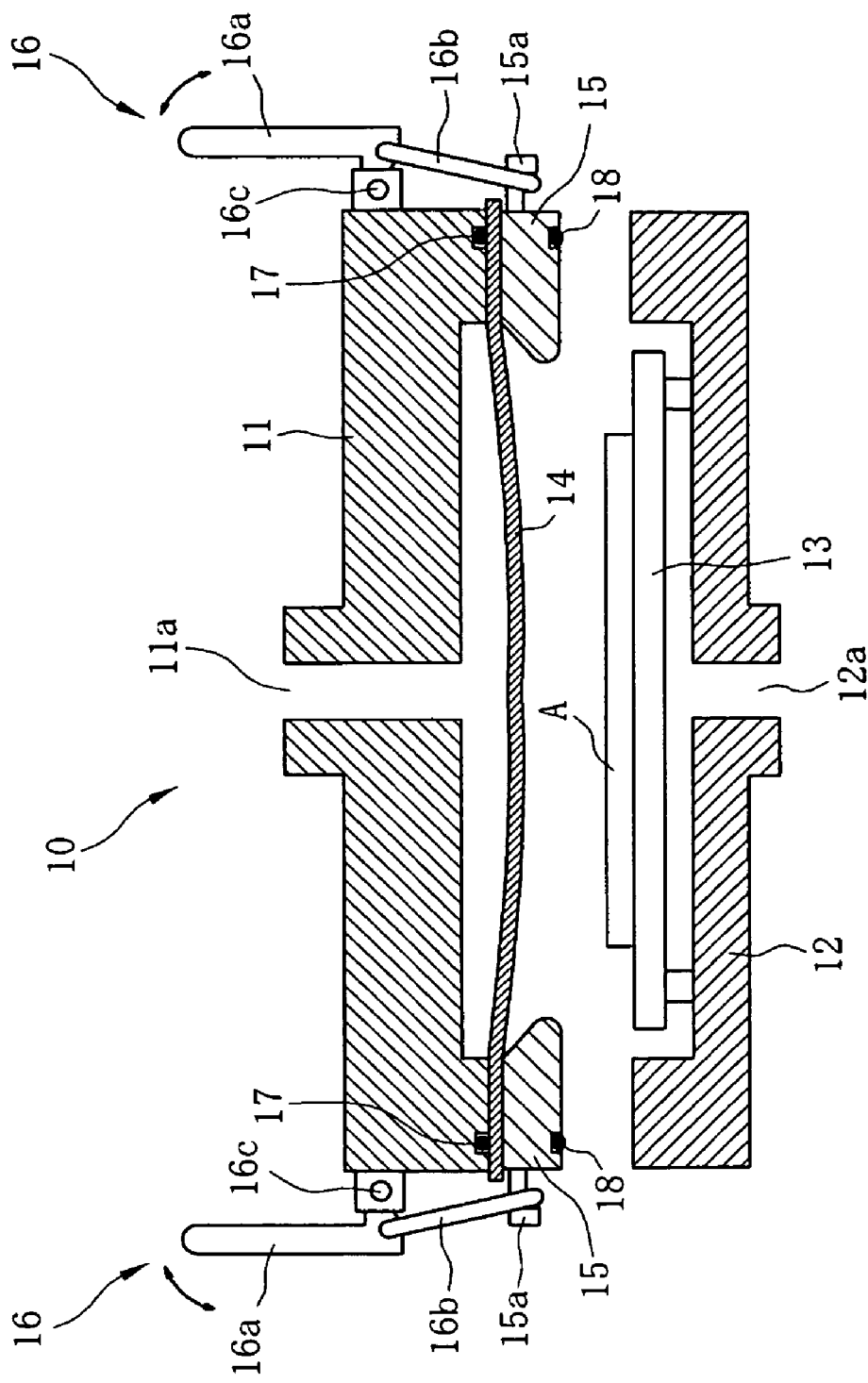
FIG. 6 is a diagram showing an example of a diaphragm mounting structure in a conventional laminator.

FIG. 5 is a cross-sectional view of a second embodiment of the present invention. In this second embodiment, a flat panel 165 is inserted between the pressure bolts 163 of the clamps 160 and the diaphragm 140. The diaphragm 140 can be pressed by the flat panel 165 over an entire plane instead of at discrete points, facilitating prevention of leakage in the vacuum.

Although the flat panel 165 may be of any length, a length that can straddle a plurality of the clamps 60 enables the diaphragm 140 to be pressed against one entire long side of the upper chamber 110, so as to provide even more reliable prevention of leakage in the vacuum.

In addition, an angle bar may be used for the flat panel 165.

It should be noted that, preferably, to keep the flat panel 165 from dropping when the clamps 160 are unclamped when replacing the diaphragm 140, the flat panel 165 is connected to the pressure bolts 163.

It should be noted that the exact terminology employed in the foregoing description is illustrative only, and used solely to facilitate comprehension of the present invention. Therefore, the present invention is not to be limited to the specific terms so selected. Moreover, it is to be understood that each specific element disclosed herein includes all equivalents thereof that operate in a similar manner and achieve a similar result.

As many widely different embodiments of the present invention can be made without departing from the spirit and scope thereof, it is to be understood that the invention is not limited to the specific embodiments thereof except as defined in the appended claims, which are to be given the widest permissible scope of interpretation consistent with the present disclosure.

What is claimed is:

1. A laminator comprising:
   an upper chamber;
   a diaphragm mounted on a bottom surface of the upper chamber; and
   a lower chamber, on which the upper chamber is stacked and which includes a support base on which a workpiece A to be laminated is set,
   wherein the diaphragm is larger than the upper chamber, such that an excess portion of the diaphragm protruding outside the upper chamber in a state in which the diaphragm is mounted on the upper chamber is folded upward and clamped against sides of the upper chamber by a plurality of clamps to fix the diaphragm in place on the upper chamber,
   wherein each clamp of the plurality of clamps includes an operating lever provided with a pressure member, such that, when operated, the clamp enables switching between a clamped state and an unclamped state of the diaphragm against the sides of the upper chamber,
   wherein, in the clamped state, the pressure members of the operating levers press the excess portion of the diaphragm against the sides of the upper chamber.

2. The laminator according to claim 1, wherein the upper chamber has a rectangular shape and the plurality of clamps is provided only along opposed long sides of the rectangular-shaped upper chamber.

3. The laminator according to either claim 1 or claim 2, wherein a flat panel is inserted between the clamps and the diaphragm when the excess portion of the diaphragm that protrudes outside the upper chamber when the diaphragm is mounted on the upper chamber is folded upward and clamped against the sides of the upper chamber by the plurality of clamps.

\* \* \* \* \*